United States Patent
Kray et al.

(10) Patent No.: US 10,830,067 B2
(45) Date of Patent: Nov. 10, 2020

(54) MECHANICAL AIRFOIL MORPHING WITH INTERNAL MECHANICAL STRUCTURES

(71) Applicant: General Electric Company, Schenectady, NY (US)

(72) Inventors: Nicholas Joseph Kray, Mason, OH (US); Paul Gerard Marsland, Milford, OH (US); Wayne Allen Spence, Cincinnati, OH (US); Abhijeet Yadav, Bangalore (IN); Samar Jyoti Kalita, Cincinnati, OH (US); Nitesh Jain, Bangalore (IN); Narendra D. Joshi, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 213 days.

(21) Appl. No.: 15/923,545

(22) Filed: Mar. 16, 2018

(65) Prior Publication Data
US 2019/0284943 A1 Sep. 19, 2019

(51) Int. Cl.
*F01D 7/02* (2006.01)
*F01D 5/14* (2006.01)

(52) U.S. Cl.
CPC ............... *F01D 7/02* (2013.01); *F01D 5/147* (2013.01); *F05D 2240/30* (2013.01); *F05D 2300/522* (2013.01)

(58) Field of Classification Search
CPC ... F01D 7/02; F01D 5/147; F01D 7/00; F05D 2240/30; F05D 2300/522; F04D 15/0055; F04D 29/287
See application file for complete search history.

(56) References Cited

U.S. PATENT DOCUMENTS

| | | | | | |
|---|---|---|---|---|---|
| 2,828,941 | A * | 4/1958 | Foley | ........................ | F01D 5/16 416/231 R |
| 5,165,860 | A * | 11/1992 | Stoner | ........................ | F01D 5/26 416/224 |
| 6,283,707 | B1 * | 9/2001 | Chin | ........................ | F01D 5/16 416/248 |
| 6,827,551 | B1 * | 12/2004 | Duffy | ........................ | F01D 5/16 415/119 |
| 7,470,114 | B2 * | 12/2008 | Bonnet | ........................ | F03D 1/06 416/226 |
| 8,657,561 | B2 | 2/2014 | Buffone et al. | | |
| 8,827,644 | B2 | 9/2014 | Behrens et al. | | |

(Continued)

FOREIGN PATENT DOCUMENTS

| EP | 2397403 | 12/2011 |
|---|---|---|
| GB | 2475376 | 5/2011 |

OTHER PUBLICATIONS https://cannonnnuskegon.com/cmsx-4/ (Year: NA).*
https://www.upmet.com/products/cobalt/alloy-l605 (Year: NA).*

*Primary Examiner* — Aaron R Eastman
(74) *Attorney, Agent, or Firm* — Hanley, Flight & Zimmerman, LLC

(57) ABSTRACT

An airfoil for a turbomachinery rotor includes: a body having a first density, the body defining a pressure side and a suction side, the pressure side and suction side intersecting at a leading edge and a trailing edge; and a mass positioned within the body and having a second density, wherein the second density is greater than the first density, wherein the mass is offset from a center of gravity of the body in at least one axis.

13 Claims, 6 Drawing Sheets

(56) References Cited

U.S. PATENT DOCUMENTS

| | | | | |
|---|---|---|---|---|
| 9,651,024 | B2* | 5/2017 | Soloway | F03D 1/0675 |
| 9,765,625 | B2* | 9/2017 | Stiehler | F01D 5/10 |
| 2008/0063533 | A1* | 3/2008 | Boyle | F01D 5/28 |
| | | | | 416/241 R |
| 2009/0056126 | A1* | 3/2009 | Chivers | F01D 5/147 |
| | | | | 29/889.2 |
| 2012/0068469 | A1 | 3/2012 | Behrens et al. | |
| 2013/0287588 | A1 | 10/2013 | Shim et al. | |
| 2013/0302168 | A1* | 11/2013 | Kray | F01D 5/141 |
| | | | | 416/131 |
| 2016/0130953 | A1* | 5/2016 | Brandl | F01D 5/147 |
| | | | | 416/95 |
| 2016/0319669 | A1* | 11/2016 | Morris | F01D 5/16 |
| 2016/0341221 | A1* | 11/2016 | Twelves, Jr. | B22F 3/1055 |

* cited by examiner

US 10,830,067 B2

MECHANICAL AIRFOIL MORPHING WITH INTERNAL MECHANICAL STRUCTURES

BACKGROUND OF THE INVENTION

The present invention relates generally to aircraft propulsion, and more specifically to aircraft engines incorporating airfoils having a contour that deforms in a predetermined manner under centrifugal force loading.

A gas turbine engine includes several rotors each of which includes a rotating disk carrying an array of airfoils. Rotors having airfoils of fixed shape are designed to operate the most efficiently at a predetermined set of conditions. One of these conditions is the rotational speed of the rotor and associated aerodynamic loads. It is common for aerodynamic loads on an airfoil to cause deflection of the airfoil away from its intended shape. It is known to vary the shape of an airfoil to compensate for aerodynamic deflection and/or to improve efficiency at different speeds. One conventional method of changing airfoil shape, i.e., "active morphing", is through actuators that are included in the airfoil. Another conventional way is passively such as through structure determined by unsymmetrical composite material layup, i.e., "passive morphing".

One problem with active morphing is that actuators add weight and can be too large to fit within some airfoils.

One problem with passive morphing is that the method of manufacture can be difficult and expensive.

BRIEF DESCRIPTION OF THE INVENTION

These problems are addressed by an airfoil that includes localized areas of increased density such that the airfoil has a first contour under a first centrifugal force load and a second contour under a second centrifugal force load. In this manner, centrifugal force is used as a passive actuator to manipulate airfoil shape.

According to one aspect of the technology described herein, an airfoil for a turbomachinery rotor includes: a body having a first density, the body defining a pressure side and a suction side, the pressure side and suction side intersecting at a leading edge and a trailing edge; and a mass positioned within the body and having a second density, wherein the second density is greater than the first density, wherein the mass is offset from a center of gravity of the body in at least one axis.

According to another aspect of the technology described herein, a method for changing the shape of an airfoil for a turbomachinery rotor includes the steps of: applying a first centrifugal force to a body of the airfoil and to a mass positioned within the airfoil body, such that forces cause the airfoil to deform, wherein the body has a first density and the mass has a second density greater than the first density.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
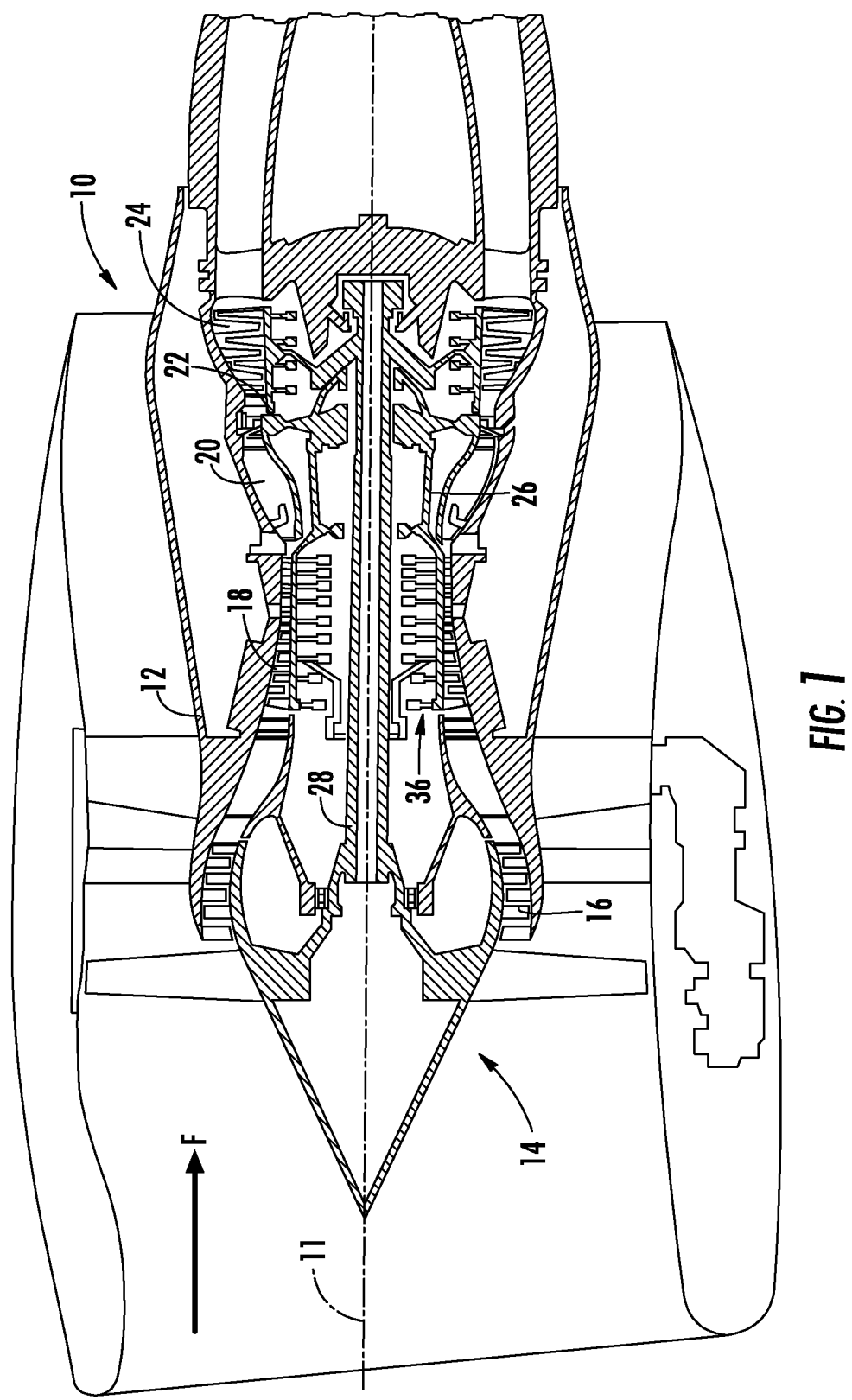
FIG. 1 is a cross-sectional schematic view of a gas turbine engine that incorporates an airfoil that includes localized areas of increased density.

Referring to the drawings wherein identical reference numerals denote the same elements throughout the various views, FIG. 1 depicts an exemplary gas turbine engine 10. While the illustrated example is a high-bypass turbofan engine, the principles of the present invention are also applicable to other types of engines. Such engines can be low-bypass turbofans, turbojets, turboprops, etc., as well as to land vehicles, land-based gas turbine engines, or other types of turbomachinery such as steam turbines.

The engine 10 has a longitudinal center line or axis 11 and a stationary core casing 12 disposed concentrically about and coaxially along the axis 11. It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 14, a booster 16, a compressor 18, a combustor 20, a high-pressure turbine or "HPT" 22, and a low-pressure turbine or "LPT" 24 arranged in serial flow relationship. In operation, pressurized air from the compressor 18 is mixed with fuel in the combustor 20 and ignited, thereby generating combustion gases. Some work is extracted from these gases by the high-pressure turbine 22 which drives the compressor 18 via an outer shaft 26. The combustion gases then flow into the low-pressure turbine 24 which drives the fan 14 and booster 16 via an inner shaft 28.

The engine 10 includes a turbomachinery rotor 36 that is a representative of a rotatable component as that term is used herein. The concepts of the present invention will be described using the rotor 36 embodied in the compressor 18 as an example. It will be understood that those concepts are applicable to any rotor or rotor-like component in a gas turbine engine, such as compressor or turbine rotors.

Figure 2:
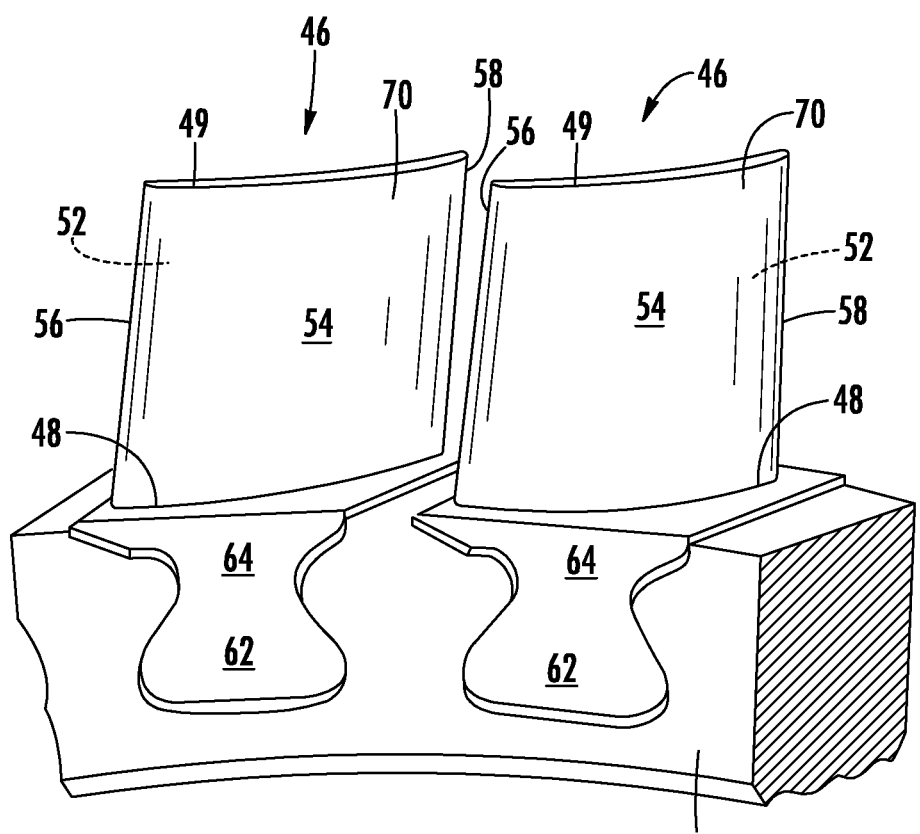
FIG. 2 is a perspective view of a portion of a rotor of the engine of FIG. 1.

Referring now to FIG. 2, the rotor 36 includes a disk 38, and an array of compressor blades 46 extends from the disk 38. The rotor 36 is concentric to the axis 11. In FIG. 2, two of the compressor blades 46 are shown. The compressor blades 46 each include an airfoil 70. Each airfoil 70 extends from a root 48 to a blade tip 49. The airfoil 70 includes a concave pressure side 52 joined to a convex suction side 54 at a leading edge 56 and a trailing edge 58. The root 48 of each airfoil 70 connects to a dovetail 62 through a shank 64.

The compressor blades 46 may be constructed from any material capable of withstanding the anticipated stresses and environmental conditions in operation. Nonlimiting examples of known suitable alloys include nickel- and cobalt-based alloys. Other suitable materials include composite materials, such as carbon reinforcing fibers in an epoxy matrix, with or without metallic shielding. Alternatively, the airfoils may be integral with disk eliminating the dovetail and shank features 62 and 64

Figure 3:
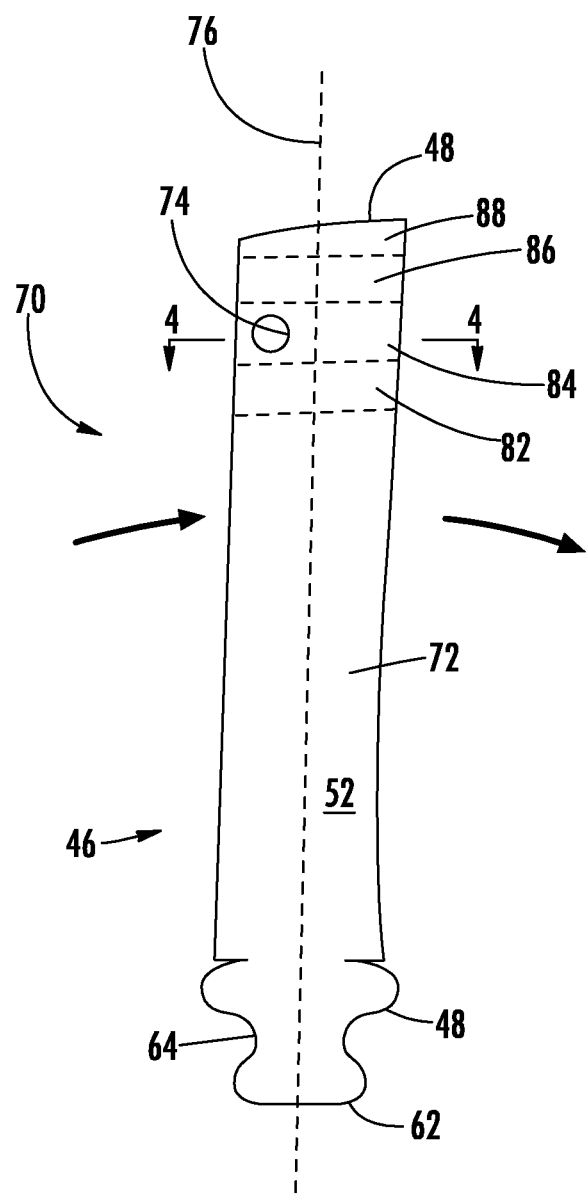
FIG. 3 is a schematic side elevation view of an airfoil of the rotor shown in FIG. 1.

The airfoil 70 includes a body 72 and a mass 74 that is positioned within the body 72 as shown in FIG. 3. In the illustrated embodiment, the body 72 is of a generally uniform first density. The uniform density of the body 72 is determined by the material or materials of construction of the body 72. Alternatively, the body 72 could comprise a combination of solid material and open volumes (e.g. internal cavities), in which case the first density would be the average density of the solid and open portions.

In contrast, the mass 74 has a second density and the second density is greater than the first density. Thus, the mass 74 is a region of the body 72 that is more dense than other regions of the body 72. The mass 74 is located such that it is offset from the center of gravity of the airfoil 70 in at least one axis.

The mass 74 can be of the parent material or a different material. The relative greater density of the mass 74 and the body 72 can be a result of the mechanical structure or a difference in materials. When the mass 74 and the body 72 are formed of the same parent material, the mass 74 can be formed of a solid portion of the parent material and the body 72 can be formed of a more open structure such that the body 72 is less dense.

Figure 4:
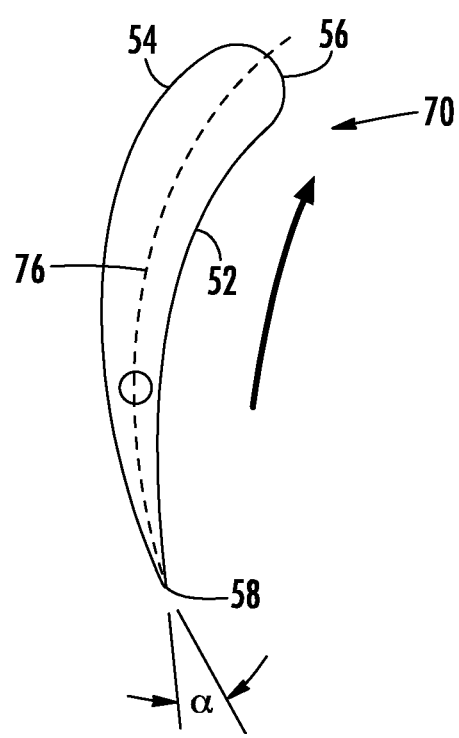
FIG. 4 is a schematic sectional view taken along lines 4-4 of FIG. 3.
Figure 5:
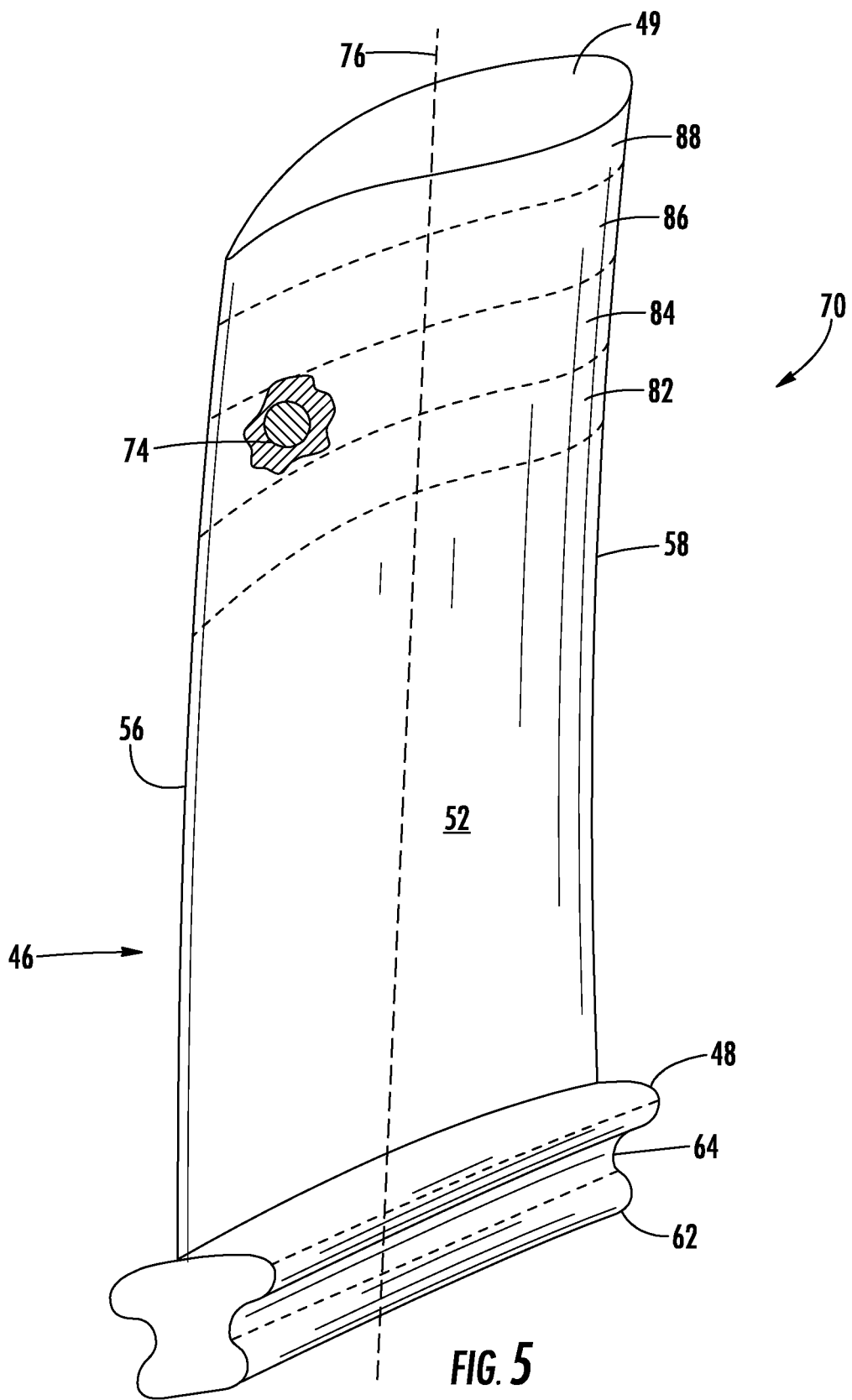
FIG. 5 is a perspective view of the airfoil shown in FIG. 3.

Referring to FIGS. 3 and 4, the airfoil 70 may be represented as an array or "stack" of individual airfoil sections arrayed along a spanwise stacking line 76. Although not shown in the illustrated example, typically, the airfoil 70 would incorporate "twist", a feature in which the stacked airfoil sections are rotated relative to each other about the spanwise stacking line 76. Also, it will be understood that the airfoil 70 may incorporate "lean", a feature in which the stacked airfoil sections are laterally shifted relative to each other, and/or "sweep", a feature in which the stacked airfoil sections are shifted in the chordwise direction. These features combine to define an airfoil shape.

Referring to FIG. 3, four representative airfoil sections are shown: a first section 82, a second section 84, a third section 86, and a fourth section 88. The mass 74 is embedded within the second section 84.

In use, the engine 10 would be operated at varying rotational speeds of the rotor 36. In one condition, the engine 10 may be operated such that the rotor 36 is rotating at a first speed and the airfoil 70 is loaded with a first centrifugal force that is directed from the axis 11 radially outward. While the rotor 36 is rotating at the first speed, the airfoil 70 defines a first airfoil contour. According to the illustrated embodiment, the first contour is such that the second section 84 shown in FIG. 4 has a trailing edge angle with respect to the axial direction, labeled "α".

In another operating condition, the engine 10 may be operated such that the rotor 36 is rotating at a second speed greater than the first speed, and the airfoil 70 is loaded with a second centrifugal force, greater than the first centrifugal force, that is directed from the axis 11 radially outward. Under the second centrifugal force the airfoil 70 has a second contour. According to the illustrated embodiment, the second contour is such that the airfoil section 84 has a second value of the trailing edge angle α, which is different from the first value of the angle α.

When the airfoil 70 is loaded with the first centrifugal load, the forces affecting the airfoil 70, including the body 72 and the mass 74, are in equilibrium and the first contour is defined. When the airfoil 70 is loaded with the second centrifugal load, the forces affecting the airfoil 70, including the body 72 and the mass 74, are also in equilibrium and the second contour is defined. However, due to the density differences between the mass 74 and the body 72 the body 72 experiences bending and deflection such that the forces related to the second centrifugal force remain in equilibrium. It is the bending the deflection that causes the change in airfoil shape to the second contour.

It should be appreciated that the contour of adjacent sections can also be affected. The first section 82 is likely to be more affected than the third section 86 and the fourth section 88. This is because the first section 82 is positioned between the second section 84 where the mass 74 is located and the axis 11.

Figure 6:
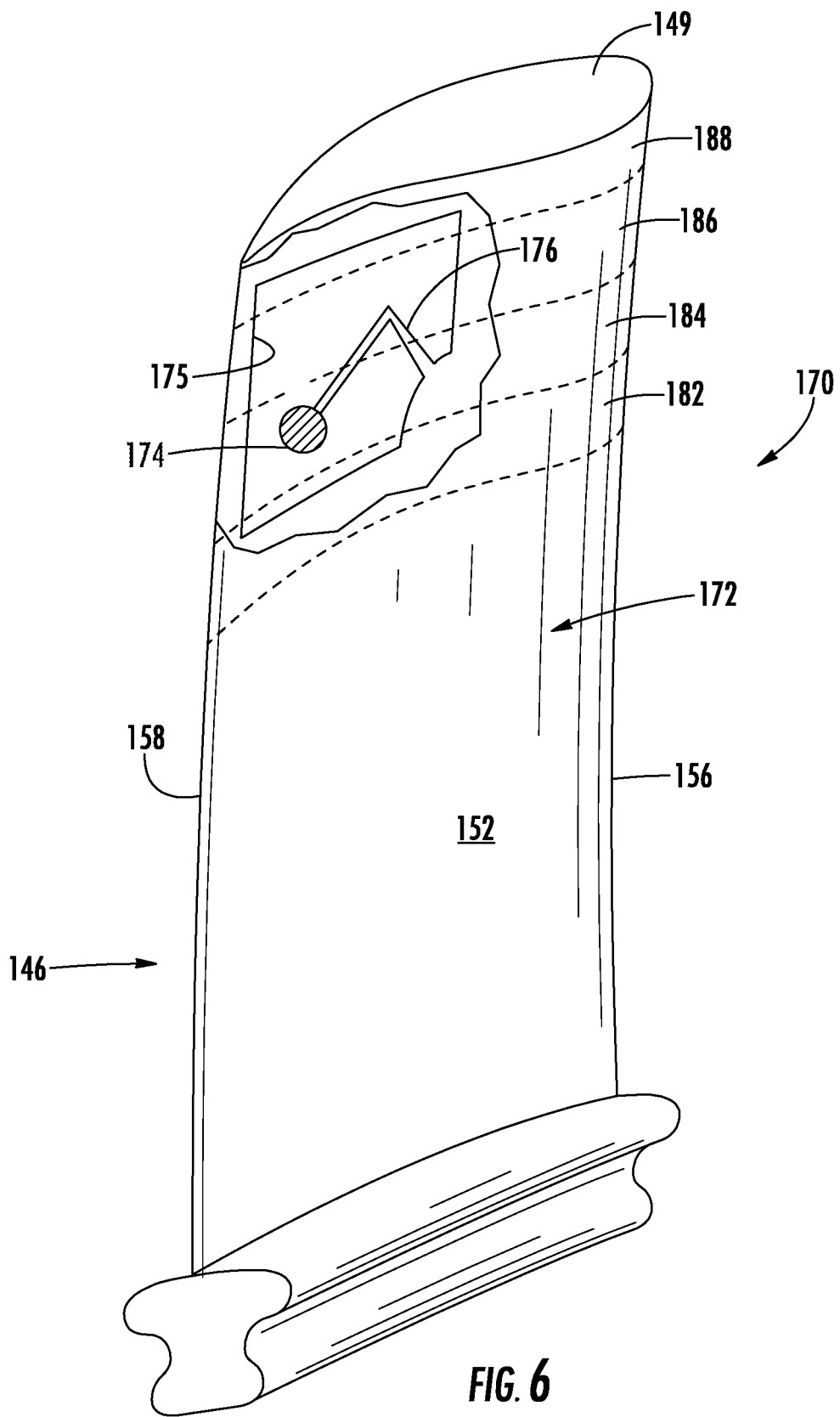
FIG. 6 is a perspective view of an alternative embodiment airfoil in a first configuration.
Figures 7, 8:
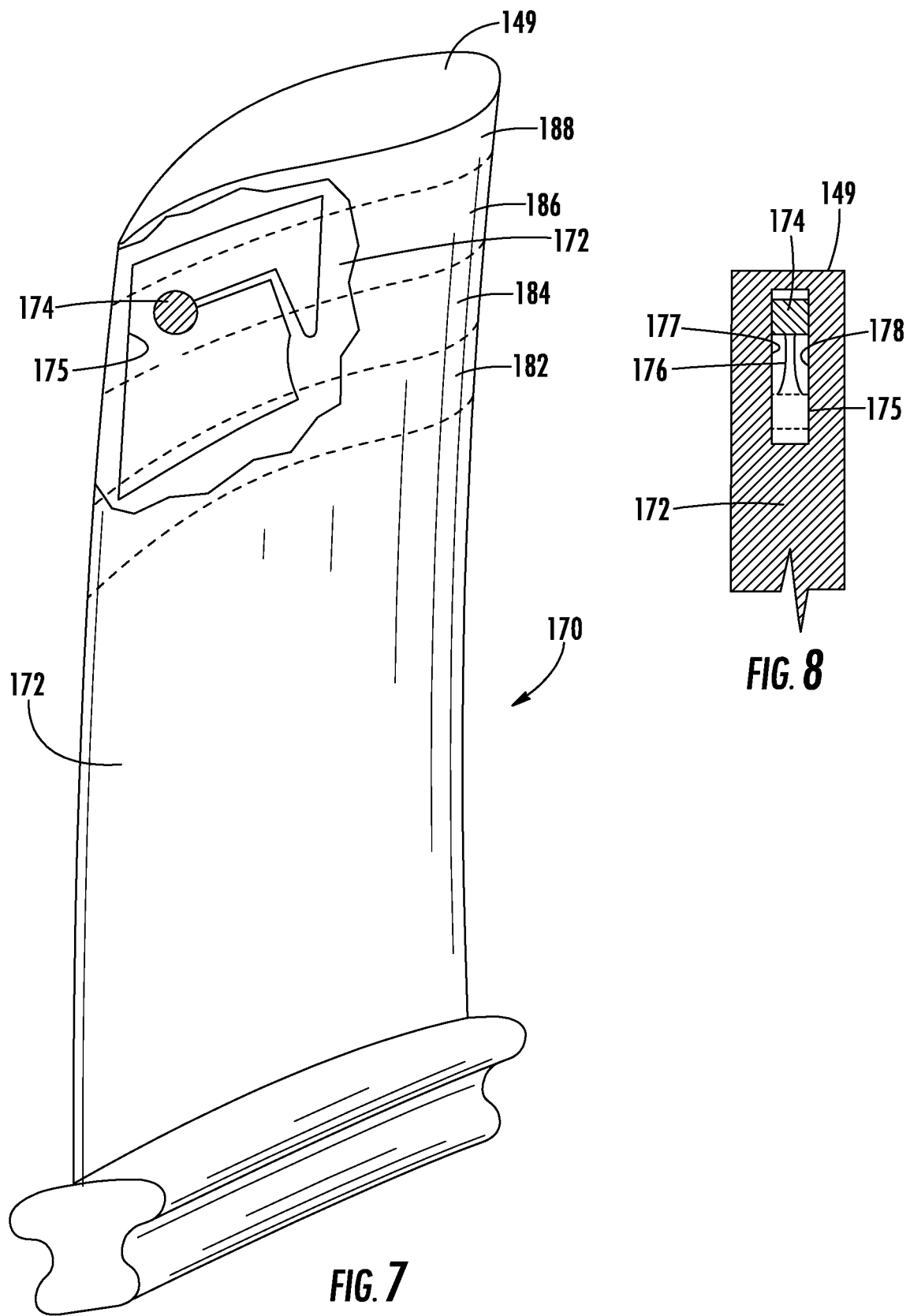
FIG. 7 is a perspective view of an alternative embodiment airfoil in a second configuration.
FIG. 8 is a partial sectional view of the airfoil shown in FIG. 6.

Referring now to FIGS. 6-8, an alternative embodiment is described. Elements associated with referenced numbers in the "100" series can be generally understood for description of elements associated with similar numbers of the "0" series described above.

FIG. 6 shows an alternative compressor blade 146. Each blade 146 includes an airfoil 170 that includes a first airfoil section 182, a second section 184, a third section 186, and a fourth section 188. The sections are merely representative examples. A mass 174 is positioned within a cavity 175 that is defined within a body 172 of the airfoil 170. The mass 174 is dimensioned such that it generally is not capable of lateral motion in that lateral forces will be transmitted directly to the body 172 but can move outward toward the tip 149 in response to increasing centrifugal force. In this regard, the mass 174 is configured to contact a first wall surface 177 of the cavity 175 and a second wall surface 178 of the cavity 175 as shown in FIG. 8.

The mass 174 is attached to an attenuating arm 176 that is attached to the body 172. The attenuating arm 176 is configured such that it is spring-like such that the mass 174 is maintained at a first position within the second section 184 under a first centrifugal load. Under a second centrifugal load, the mass 174 is positioned within the third section 186. In this manner, airfoil sections 186 which is outward of the second section 184 is affected by the centrifugal force acting on the mass 174.

The attenuating arm 176 can be configured such that under a third centrifugal load the mass 174 moves further outward to the fourth section 188. In this manner, sections of the airfoil 170 that were not affected by the centrifugal forces acting on the mass 174 are changed under higher centrifugal loads.

According to other embodiments, other characteristics of the airfoil 170 can be varied with changing centrifugal force. Nonlimiting examples of these other characteristics include twist, i.e. the relative pitch of each airfoil section, airfoil camber, and the lean of the airfoil.

All or part of the airfoils 70, 170 or portions thereof, including the masses 74, 174 and/or attenuating arm 176 may be part of a single unitary, one-piece, or monolithic component, and may be manufactured using a manufacturing process which involves layer-by-layer construction or additive fabrication (as opposed to material removal as with conventional machining processes). Such processes may be referred to as "rapid manufacturing processes" and/or "additive manufacturing processes," with the term "additive manufacturing process" being term herein to refer generally to such processes.

The foregoing has described an airfoil for mechanical airfoil morphing with internal mechanical structures. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An airfoil for a turbomachinery rotor, comprising:
a body having a first density, the body defining a pressure side and a suction side, the pressure side and suction side intersecting at a leading edge and a trailing edge;
an attenuating arm attached within the body; and
a mass coupled to the arm and positioned within the body, the mass having a second density, wherein the second density is greater than the first density, wherein the mass is offset from a first center of gravity of the body in at least one axis when the airfoil is stationary, the mass translating when the airfoil is rotating, the translation of the mass causing the body to have a second center of gravity, the mass positioned such that the mass is only movable radially inward and radially outward relative to the body.

2. The airfoil according to claim 1, wherein the airfoil is configured to have a first shape under a first centrifugal force and a second shape under a second centrifugal force.

3. The airfoil according to claim 2, wherein the second shape has a different airfoil twist from the first shape.

4. The airfoil according to claim 2, wherein the second shape has a different camber from the first shape.

5. The airfoil according to claim 2, wherein the second shape has a different trailing edge angle from the first shape.

6. The airfoil according to claim 1, wherein at the mass, the attenuating arm, and the body are part of a monolithic whole.

7. A rotor, comprising:
a disk; and
an airfoil;
a body having a first density, the body defining a pressure side and a suction side, the pressure side and suction side intersecting at a leading edge and a trailing edge;
an attenuating arm attached within the body; and
a mass coupled to the arm and positioned within the body, the mass having a second density, wherein the second density is greater than the first density, wherein the mass is offset from a first center of gravity of the body in at least one axis when the airfoil is stationary, the mass translating when the airfoil is rotating, the translation of the mass causing the body to have a second center of gravity, the mass positioned such that the mass is only movable radially inward and radially outward relative to the body.

8. The rotor according to claim 7, wherein the airfoil is configured to have a first shape under a first centrifugal force and a second shape under a second centrifugal force.

9. The rotor according to claim 8, wherein the second shape has a different airfoil twist from the first shape.

10. The rotor according to claim 8, wherein the second shape has a different camber from the first shape.

11. The rotor according to claim 8, wherein the second shape has a different trailing edge angle from the first shape.

12. The rotor according to claim 7, wherein at the mass, the attenuating arm, and the body are part of a monolithic whole.

13. The rotor according to claim 12, wherein the rotor is part of the monolithic whole.

* * * * *